United States Patent

Gyulavari et al.

[11] Patent Number: 5,227,054
[45] Date of Patent: Jul. 13, 1993

[54] FILLING BODY BIOLOGICAL UNITS AND COOLING TOWERS

[76] Inventors: Imre Gyulavari, Nádor utca 8., 1051 Budapest; Vladimir Kormos, Gyula v.u. 47/c., 1223 Budapest, both of Hungary

[21] Appl. No.: 793,335
[22] PCT Filed: May 8, 1991
[86] PCT No.: PCT/HU91/00017
   § 371 Date: Mar. 9, 1992
   § 102(e) Date: Mar. 9, 1992
[87] PCT Pub. No.: WO91/17122
   PCT Pub. Date: Nov. 14, 1991

[51] Int. Cl.$^5$ ............................................. B01J 19/30
[52] U.S. Cl. ..................... 210/150; 210/151; 261/112.2; 261/DIG. 72
[58] Field of Search ................... 210/150, 151; 261/DIG. 72, 94, 112.2

[56] References Cited

U.S. PATENT DOCUMENTS

| | | | |
|---|---|---|---|
| 1,360,928 | 11/1920 | Goodwin | 261/DIG. 72 |
| 2,188,162 | 1/1940 | Schulhoff | 210/150 |
| 3,232,865 | 2/1966 | Quinn et al. | 210/150 |
| 3,347,381 | 10/1967 | Minch et al. | 210/150 |
| 3,489,208 | 1/1970 | Manteufel | 261/DIG. 72 |
| 3,502,596 | 3/1970 | Sowards | 210/150 |
| 4,014,962 | 3/1977 | del Notario | 261/DIG. 72 |
| 4,251,239 | 2/1981 | Clyde et al. | 261/DIG. 72 |
| 4,366,608 | 1/1983 | Nagaoka | 261/DIG. 72 |
| 4,385,012 | 5/1983 | Priestley | 210/150 |
| 4,472,358 | 9/1984 | Khudenko | 210/150 |
| 4,634,534 | 1/1987 | Cominetta et al. | 210/150 |
| 4,666,593 | 5/1987 | Bosne | 210/150 |
| 4,675,103 | 6/1987 | Nadudvari et al. | 210/150 |
| 4,830,792 | 5/1989 | Wilhelm | 261/DIG. 72 |

FOREIGN PATENT DOCUMENTS

| | | | |
|---|---|---|---|
| 8705827 | 10/1987 | PCT Int'l Appl. | 261/DIG. 72 |
| 0837381 | 6/1981 | U.S.S.R. | 261/DIG. 72 |
| 0948407 | 8/1982 | U.S.S.R. | 261/DIG. 72 |
| 1375302A | 2/1988 | U.S.S.R. | 261/DIG. 72 |

*Primary Examiner*—Stanley S. Silverman
*Assistant Examiner*—Cynthia L. Nessler
*Attorney, Agent, or Firm*—Blakely, Sokoloff, Taylor & Zafman

[57] ABSTRACT

An immersible filling body for the biological treatment of sewage stored in the basins of sewage treatment plants, aerated ponds and lagoons. The filling body is comprised of vertical channels for conducting the flow of a gas-liquid mixture. Each channel includes a central portion of substantially constant cross sectional area and two outer portions of variable cross sectional areas in order to produce a more vigorous communication between both the liquid and the gas and the liquid and the channel walls.

13 Claims, 3 Drawing Sheets

FILLING BODY BIOLOGICAL UNITS AND COOLING TOWERS

BACKGROUND OF THE INVENTION

1. Field of the Invention

The invention relates to a filling body with channels for the flow of liquid and gas mixture, and which may be applied especially for units in sewage treatment plants, as submerged biological units, active units with bound biological skin dripping bodies filling bodies of cooling-towers, etc.

2. Description of the Related Art

It is known that one of the state of the art methods for purification of organically polluted sewage effluent is applying active units with a bound biological skin (biofilm). Anaerobic and aerobic techniques are identified.

In both cases a skin developed from micro-organisms is bound to the surface of immersible units submerged under a working water line. This skin is the active agent of the system. The immersible unit consists of elements of high specific surface, as of mesh, screen, strainer, porous material, or a vertically coursed medium (e.g. by upright channels).

The biological skin formed on the surface of the immersible unit—for an aerobic system—is to be supplied with oxygen. Blowing air or technical oxygen into the water under the immersible unit is how the need is satisfied. The bubbles of the effluvium move upward within the courses of the immersible unit and tortuous flow develop around them locally. Consequently, the dissolution of the gas becomes more efficient, a solution of higher oxygen-concentration flows through the channels, and the speed of flow increases.

All these result in a more efficient gas-exchange between the moving liquid and the biofilm, and in a more efficient operation of the system. That type of aerobic system is called a system of contact-oxidation with bound biofilm.

Other techniques for the biological treatment of sewage are also known, as piping the effluent into treating lagoons, oxidation ponds, or systems working with a double sort of activated sludge, which later utilize the impact of both the surface bound and floating micro-organisms. The surface bound skin is settled to the skirts of contact devices.

A contact device is a unit assembled into a system, or adequate for being assembled into a system called generally a filling body.

There are several requirements a filling body must satisfy. It must have a large specific surface, be sufficient to consolidate the biological skin, and be fitted with channels serving the course and turbulent flow of the liquid. The cross sectional area of the channels is most suitable if the bubbles moving up result in a speedy flow of the effluent. Additionally the local differences in the concentration of the chemical constituents issue a rapid and effective material exchange between the liquid and the channel's surface due to a turbulent flow. In an aerobic system, the increased degree of the gas exchange between the liquid and the bubbles is an added result of the turbulent flow. The active surface of the filling body related to its volume (described by a measure like $m^2/m^3$) represents another meaningful nature of the filling body. With the increase of this measure, the total area of the biofilm might be increased, thus the enlargement of this character is also an important requirement. However, the decrease of the cross sectional area of the channels is curbed by the undesirable declination of the velocity of the flowing liquid, or liquid/gas mixture.

It is requested, further, that the material of the filling body shall be chemically resistant, lightweight, helpful in consolidating the biofilm to its surface, and inexpensive. The production of the units and the assembly of the filling body shall be simple. For the most part these requirements are satisfied by using units and filling bodies of plastic, synthetic, or other compound material.

There are many known types of filling bodies and contact units made of compound material, however these satisfy the listed requirements only partly.

German patent specification no. 2901509 describes a zigzagged contact unit. The inconvenience of this type of unit is that the air-lift effect of the gas-bubbles (compare w/the mammoth pump) is discounted due to the considerable hydraulic headloss of the disperse matter migrating through the contact unit. In addition, supplementary impact-energy has to be applied to develop a turbulent flow.

An existing type of the contact unit is having vertical channels of circular cross sectional shape (pipes). The outer skirt of the pipes is fallow and the useful area utilized for consolidating the biofilm is only 40 to 60% of the total area.

SUMMARY OF THE INVENTION

It is the objective of the invention to provide a filling body for sewage treatment plants' biological units, cooling-towers, and similars, which might be manufactured using a simple technique, has a large specific surface, supports a more intensive gas exchange than the presently known types of filling bodies, and avoids the disadvantages of the presently known types of filling bodies for comparable purpose.

This is obtained according to the invention by a filling body of the kind described in the preamble of claim 1, which is characteristic in details described in the characterizing part of claim 1.

The invention lies on our understanding that a gas-liquid mixture flowing within upright channels has a more vigorous communication between the liquid and the gas, and between the liquid and the channel's wall. As a result, it undergoes a more intense gas exchange if the pressure- and flowing conditions vary along the course. This can be achieved by having channels with a constant, or substantially constant, cross sectional area along its central (intermediate) portion to which portions of altering cross sectional area are linked at the top and at the bottom.

Our further understanding for the invention is that the most proficient filling body has a honeycomb hive, in which channels of hexagonal shape cross section are arranged one to the other with only a thin structural wall between the channels.

Another understanding utilized for our invention is that the most proficient method of manufacturing the filling body is by forming from flat sheets an angular shaped corrugated sheet, preferring the vacuum-forming methods. By fitting the angular shaped corrugated sheets one to the other in a way that they shall form the previously described geometrically shaped channels, and finally by uniting them, preferring gluing.

Based upon these understandings, a filing body especially for sewage treatment plants' biological units, cooling towers, and similars, which filling body has vertical channels for conducting a flow of a gas-liquid mixture, and which channels have open ends is constructed according to the invention in a way that the channels have a constant, or substantially constant, cross sectional area along its central (intermediate) portion, to which central portion, portions of altering cross sectional area are linked at the top and at the bottom.

It is advantageous, if the portions of the filling body's neighboring channels are arranged with portions (5, 6, 7, 8) of altering cross sectional area in a way according to the invention that an enlarging portion of a channel is adjoined by a reducing portion of the other channel completing one with the other.

An other embodiment of the filling body according to the invention has channels of hexagonal shape cross section.

A further embodiment of the filling body according to the invention has channels of a cross sectional shape of a geometrically defined shape, a regular or substantially regular polygon, or advantageously that of hexagonal shape.

An other embodiment of the filling body according to the invention has channels the cross sectional area of which is between 1.0 cm$^2$ and 15.0 cm$^2$.

An advantageous embodiment of the filling body according to the invention is constructed in such a way that ratio of the length of the channel portion with a constant or substantially constant cross sectional area related to the length of any channel portion with an altering cross sectional area is between 1:4 and 4:1.

An other useful embodiment of the filling body according to the invention is constructed in such a way that the sheets providing the channels (2) are secured stationarily one to the other, advantageously gluing.

An other embodiment of the filling body according to the invention is provided with walls (9) of the channels (2) of thermoplastic, advantageously of PVC.

An other expedient embodiment of the filling body according to the invention consists of a single block.

A further beneficial embodiment of the filling body according to the invention consists of several blocks.

A further useful embodiment of the filling body according to the invention is established in a way that its mass is less than 50 kg, and its height is less than 1 m.

A additional effective embodiment of the filling body according to the invention is constructed in a way that the channels are skirted by adaptable angular shaped corrugated sheets, produced advantageously by vacuum-forming, fitted one to the other, and secured one to the other, advantageously by gluing.

BRIEF DESCRIPTION OF THE DRAWINGS

The invention will be further explained in the following with reference to the drawings, in which.

DETAILED DESCRIPTION OF THE INVENTION

Figure 1:
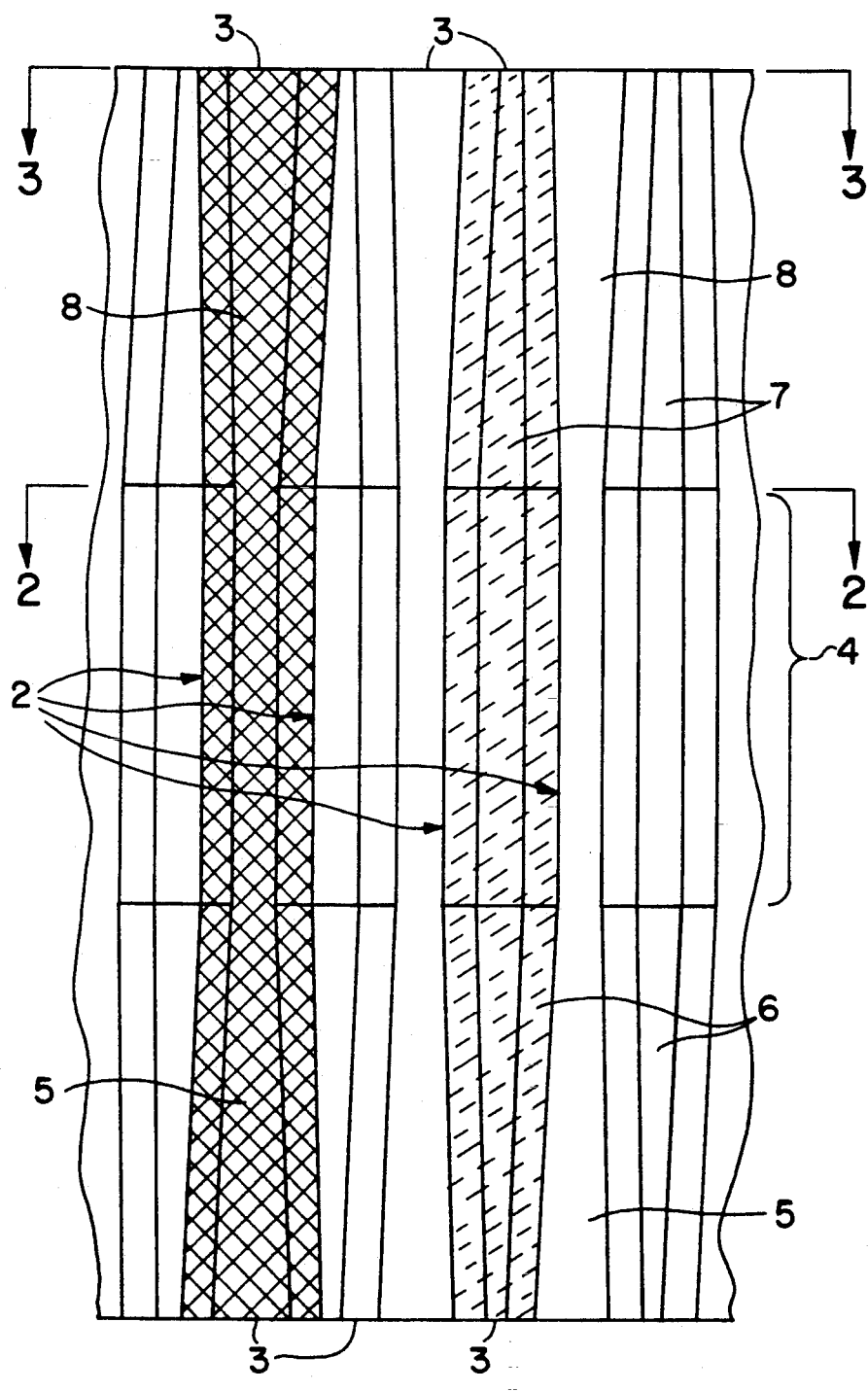
FIG. 1 shows a schematical section of a part of an embodiment of the filling body according to the invention. The section has been taken as shown by line M—M in FIG. 2.
Figure 2:
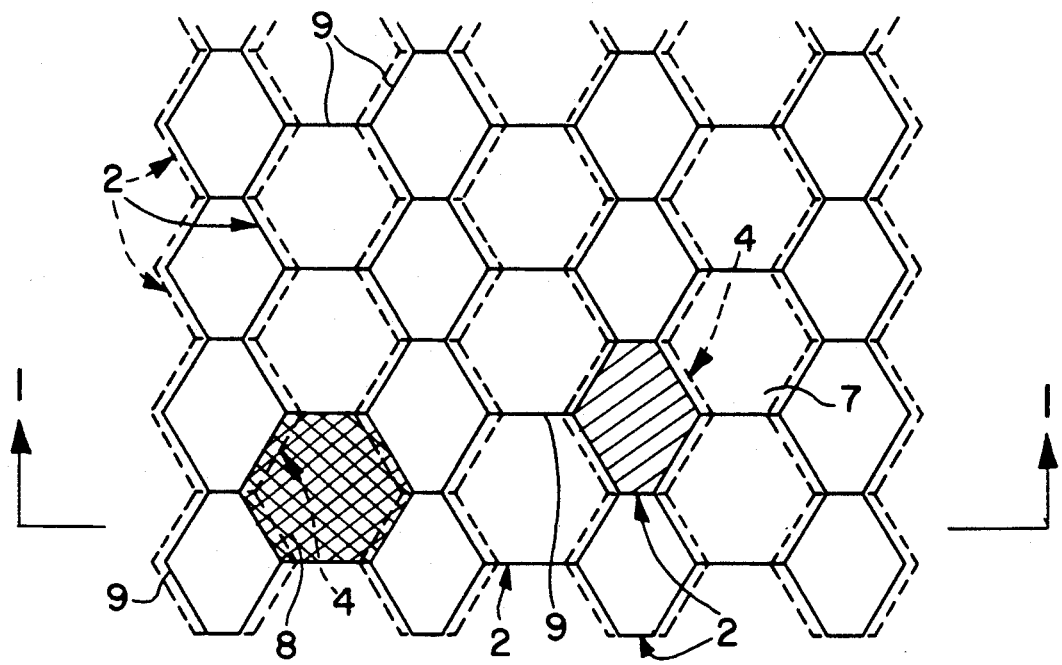
FIG. 2 shows schematically the overview of a part of the filling body displayed in FIG. 1. The view has been taken as shown by line B—B in FIG. 1.
Figure 3:
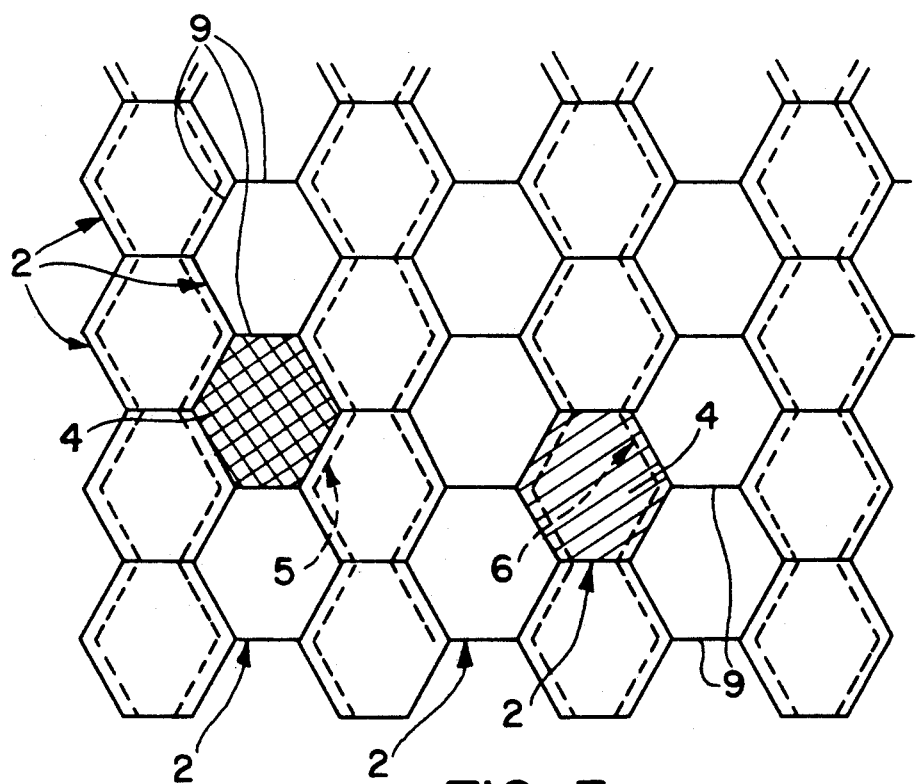
FIG. 3 shows a cross section of the part of the filling body displayed in FIG. 1. The section has been taken as shown by line A—A in FIG. 1.

Two channels in FIGS. 1 through 3 are marked, one with parallel and the other with cross hatching, and the edges being not in the plane of the section are marked with a dashed line for a better guidance.

A vertical section of a part of the filling body is represented in FIGS. 1 through 3. It may be seen that the channels (2) are oriented parallelly in a vertical position. They have open ends (3). It may be noticed that the channels have a constant, or substantially constant, cross sectional area along their central (intermediate) portion (4), to which central portion (4), portions (5, or 6) of altering cross sectional area are linked at the top and portions (7, or 8) of altering cross sectional area are linked at the bottom.

One of the channels is marked with parallel hatching in FIGS. 1 through 3. This channel has a central portion (4) of constant cross section to which portions (6, or 7) of altering cross sectional area are linked at the top and at the bottom. Both portions (6, and 7) are reducing outward. The upper portion (7) is linked to the central portion (4) at its top and is reducing upward. The lower portion (6) is linked to the central portion (4) at the bottom, and is reducing downward.

An other channel is marked with cross hatching in FIGS. 1 through 3. This channel has a central portion (4) of constant cross section to which portions (5, or 8) of altering cross sectional area are linked at the top and at the bottom. Both portions (5, and 8) are enlarging outward. The upper portion (8) is linked to the central portion (4) at its top and is enlarging upward. The lower portion (5) is linked to the central portion (4) at the bottom, and is enlarging downward.

The filling body shown in FIGS. 1 through 3 represents an embodiment with channels (2) completing one with the other. The downward enlarging portion (5) of a channel is adjoined by the downward reducing portion (6) of the other (parallelly hatched) channel, the upward enlarging portion (8) of the first channel is adjoined by the upward reducing portion (7) of the other (parallelly hatched) channel, and all these channel portions are completing one with the other.

Figure 4:
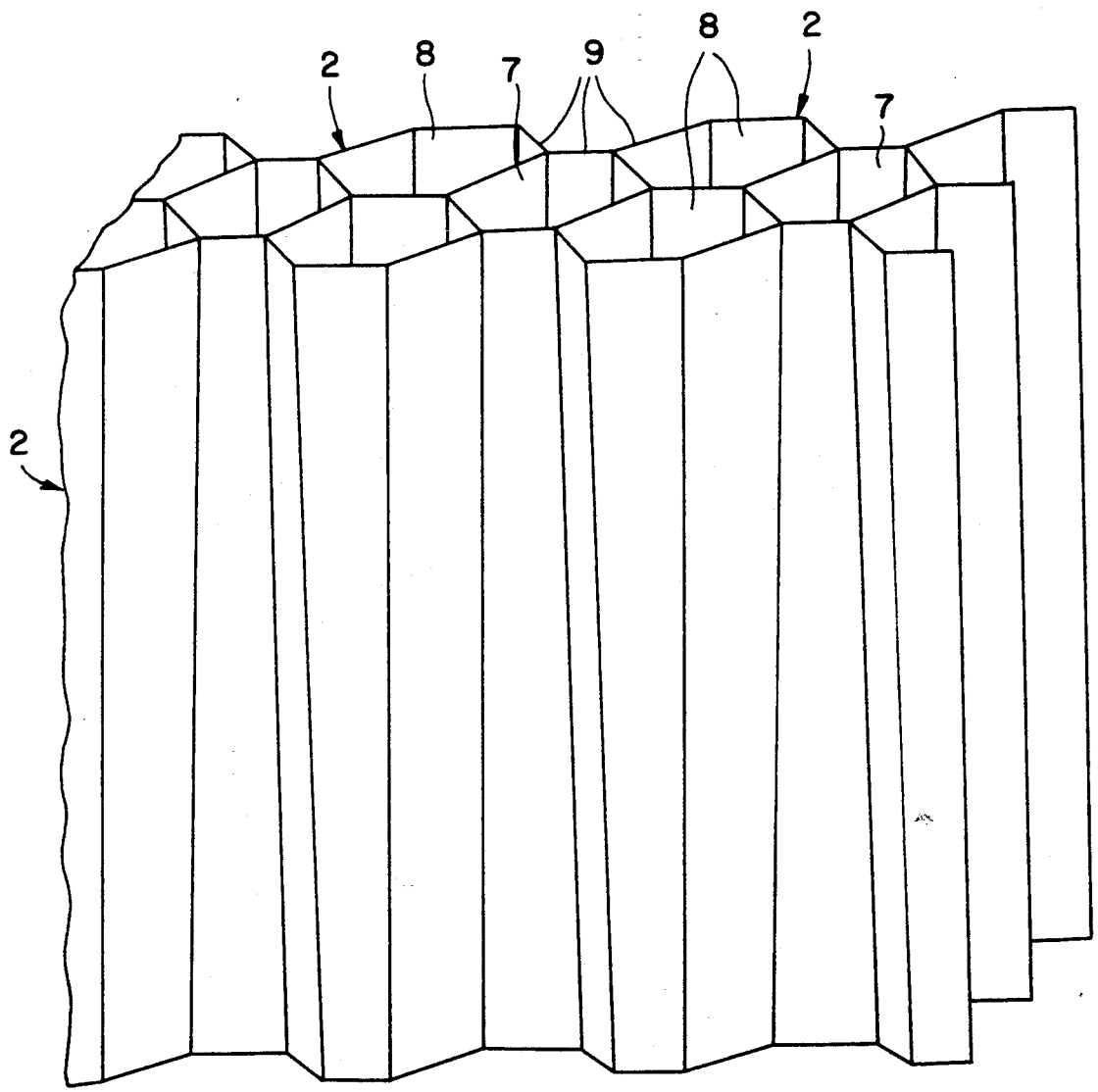
FIG. 4 shows an isometric view of the part of the filling body displayed in FIGS. 1 through 3.

FIG. 4 shows the an isometric view of the upper part of the filling body displayed in FIGS. 1 through 3. This upper part lies above the central portions (4) of the channels (2). The open end (3) of the channels (2) may be seen. The wall (9) is situated between the upward enlarging channel portions (8) and the upward reducing channel portions (7).

Comparison of FIGS. 1 through 4 highlights the situation that between the neighboring channels (2) there is only the wall (9) of the channels situated, the channel portions linked to the central channel portion at the top are completing one with the other, namely the upward enlarging channel portions (8) and the upward reducing channel portions (7) fit together.

The embodiment of the invention shown in FIGS. 1 through 4 has channels (2) of hexagonal cross section.

The invention has provided an advantageous type of filling body for sewage treatment plants' biological units, cooling towers and similars, which might be manufactured using a simple technique, has a large specific surface (described by a measure like m$^2$/m$^3$), supports a more intensive gas exchange than the presently known types of filling bodies by an effective air lift performance, and avoids the disadvantages of the presently known types of filling bodies for comparable purpose. The gas-liquid mixture flowing within upright channels has a more vigorous communication between the liquid and the gas, and between the liquid and the channel's wall as a consequence of having channels with a constant, or substantially constant, cross sectional area along its central (intermediate) portion to which portions of altering cross sectional area are linked at the top and at the bottom. As a result, the pressure- and flowing conditions vary along the course and gas-liquid the mixture undergoes a more intense material exchange between the biofilm consolidated onto the channel-walls the sewage effluent, and the gas bubbles.

The most proficient filling body has a honeycomb hive, in which channels of hexagonal shape cross section are arranged one to the other with only a thin structural wall between the channels.

The invention is not limited to the displayed example of the embodiment, there are many further embodiments of the invention described in the claims which follows.

We claim:

1. An immersible filling body for the biological treatment of sewage contained in a liquid in which said filling body is submerged below the surface of the liquid, and wherein said filling body comprises: a plurality of vertical channels for conducting a flow of a gas-liquid mixture, said vertical channels having a bore extending therethrough, said bore having a bore entrance and a bore exit, said vertical channels including:

a bore entrance for receiving the gas-liquid mixture within the bore;

an inlet portion coupled to said bore entrance and a central portion, said inlet portion having a variable cross sectional area;

a central portion interposed between said inlet portion and an outlet portion, said central portion having a substantially constant cross-sectional area;

the outlet portion coupled to said central portion and a bore exit for releasing the gas-liquid mixture below the surface of the liquid, said outlet portion having a variable cross sectional area.

2. An immersible filling body according to claim 1 wherein:

said inlet portion has a cross-sectional area greater than the cross-sectional area of said central portion, a sidewall of said inlet portion being attached to a sidewall of a corresponding inlet portion of at least one adjacent channel, said corresponding inlet portion is having a cross-sectional area less than the cross-sectional area of said central portion;

said outlet portion has a cross-sectional area greater than the cross-sectional area of said central portion, a sidewall of said outlet portion being attached to a sidewall of a corresponding outlet portion of said at least one adjacent channel, said corresponding outlet portion having a cross-sectional area less than the cross-sectional area of said central portion.

3. An immersible filling body according to claim 1, wherein said channels have a hexagonal shaped cross sectional area.

4. An immersible filling body according to claim 1, wherein said channels have a polygonal shaped cross sectional area.

5. An immersible filling body according to claim 1, wherein said channels have a cross sectional area between 1.0 $cm^2$ and 15.0 $cm^2$.

6. An immersible filling body according to claim 1, wherein the ratio between the vertical length of the central portion and said inlet portion is between 1:4 and 4:1, and the ratio between the vertical length of said central portion and said outlet portion is between 1:4 and 4:1.

7. An immersible filling body according to claim 5, wherein said channels are comprised of a plurality of walls which are made of angular shaped corrugated sheets.

8. An immersible filling body according to claim 7, wherein said sheets of said channels are secured to each other by gluing.

9. An immersible filling body according to claim 1, wherein said walls are made of thermoplastic.

10. An immersible filling body according to claim 1, wherein said filling body comprises a single block.

11. An immersible filling body according to claim 1 wherein said filling body comprises a plurality of blocks.

12. An immersible filling body according to claim 1 wherein said filling body has a mass less than 50 kg, and a height less than one meter.

13. An immersible filling body according to claim 1, wherein said channels are skirted by adaptable angular shaped corrugated sheets, produced by vacuum-forming, said sheets fitted to each other, and secured to each other by gluing.

* * * * *

UNITED STATES PATENT AND TRADEMARK OFFICE
CERTIFICATE OF CORRECTION

PATENT NO. : 5,227,054
DATED : July 13, 1993
INVENTOR(S) : Gyulavari et al.

It is certified that error appears in the above-identified patent and that said Letters Patent is hereby corrected as shown below:

In column 1 at lines 11-12 change  "biological skin dripping bodies filling bodies of cooling-towers, etc."

to

-- biological skin, dripping bodies, filling bodies of cooling-towers, etc. --

Signed and Sealed this

Thirteenth Day of June, 1995

Attest:

BRUCE LEHMAN

*Attesting Officer*        *Commissioner of Patents and Trademarks*